US007373731B2

(12) United States Patent
Nyberg

(10) Patent No.: US 7,373,731 B2
(45) Date of Patent: May 20, 2008

(54) CONSTRUCTION TEMPLATES AND METHODS OF USE

(76) Inventor: Donovahn Nyberg, P.O. Box 568, Sedalia, CO (US) 80135

( * ) Notice: Subject to any disclaimer, the term of this patent is extended or adjusted under 35 U.S.C. 154(b) by 0 days.

(21) Appl. No.: 11/468,656

(22) Filed: Aug. 30, 2006

(65) Prior Publication Data

US 2008/0052941 A1 Mar. 6, 2008

(51) Int. Cl.
*G01B 3/14* (2006.01)
*G01B 3/10* (2006.01)
*B43L 7/00* (2006.01)

(52) U.S. Cl. .............................. 33/566; 33/494; 33/758

(58) Field of Classification Search .................. 33/566, 33/1 G, 494, 758, 759, 563

See application file for complete search history.

(56) References Cited

U.S. PATENT DOCUMENTS

| | | | | | |
|---|---|---|---|---|---|
| 2,610,413 | A | * | 9/1952 | Dasey | 33/563 |
| 3,816,931 | A | | 6/1974 | Lamar | |
| 4,499,666 | A | * | 2/1985 | Smith | 33/562 |
| 4,527,981 | A | | 7/1985 | Chisum | |
| 4,573,302 | A | | 3/1986 | Caretto | |
| 5,012,590 | A | * | 5/1991 | Wagner et al. | 33/759 |
| 5,195,249 | A | | 3/1993 | Jackson | |
| 5,627,763 | A | * | 5/1997 | Carlson | 33/758 |
| 5,819,498 | A | | 10/1998 | Geraci | |
| 5,842,280 | A | | 12/1998 | Robell | |
| 6,049,987 | A | | 4/2000 | Robell | |
| 6,360,448 | B1 | * | 3/2002 | Smyj | 33/562 |
| 6,834,438 | B1 | | 12/2004 | Heister | |
| 6,895,683 | B1 | * | 5/2005 | Olsen | 33/562 |
| 6,907,674 | B2 | | 6/2005 | Grendahl | |
| 2002/0038518 | A1 | * | 4/2002 | Barrows | 33/758 |
| 2002/0066256 | A1 | | 6/2002 | Oberpriller et al. | |
| 2002/0100180 | A1 | | 8/2002 | Montefusco | |
| 2003/0061722 | A1 | | 4/2003 | Bradley | |
| 2005/0055837 | A1 | | 3/2005 | Boomershine | |

* cited by examiner

*Primary Examiner*—Christopher W Fulton
(74) *Attorney, Agent, or Firm*—Albert D. Haegele; Leyendecker & Lemire, LLC

(57) ABSTRACT

Construction templates, as well as methods of use that employ construction templates, are described. Embodiments of the present invention comprise construction specifications printed on substantially dimensionally stable material. Functions of the construction templates include, but are not limited to, (i) indicating the substantially exact locations for installing building components, (ii) protecting floors and other building components from water or weather damage during building construction, and, (iii) providing a barrier to, and containment for, construction debris that could otherwise contaminate or infiltrate a building under construction. Some embodiments comprise elongated construction templates that attach to wall plates to facilitate wall construction. Other embodiments comprise construction templates that attach to the floors of nascent buildings to display construction specifications that facilitate further building construction.

18 Claims, 7 Drawing Sheets

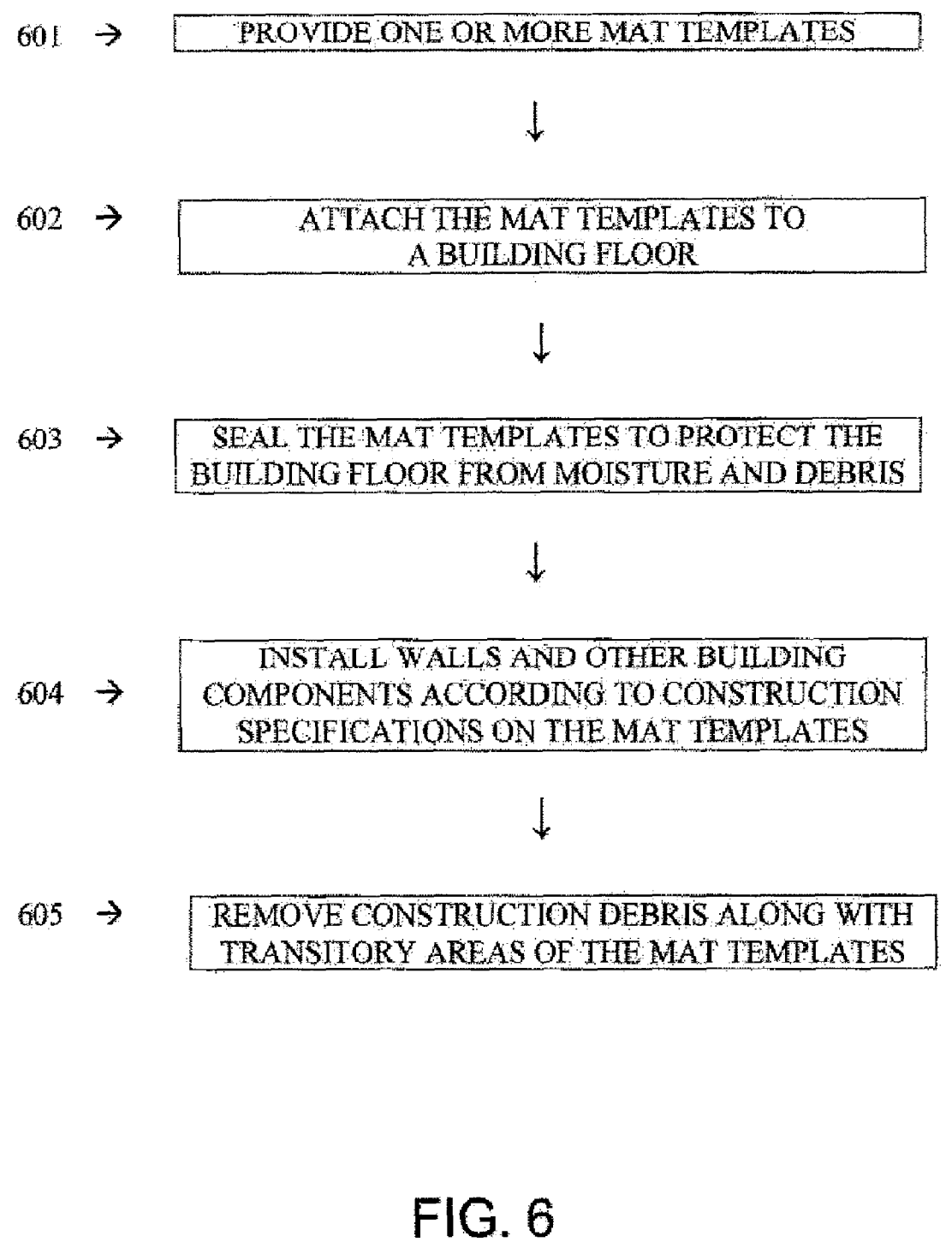

601 → PROVIDE ONE OR MORE MAT TEMPLATES

↓

602 → ATTACH THE MAT TEMPLATES TO A BUILDING FLOOR

↓

603 → SEAL THE MAT TEMPLATES TO PROTECT THE BUILDING FLOOR FROM MOISTURE AND DEBRIS

↓

604 → INSTALL WALLS AND OTHER BUILDING COMPONENTS ACCORDING TO CONSTRUCTION SPECIFICATIONS ON THE MAT TEMPLATES

↓

605 → REMOVE CONSTRUCTION DEBRIS ALONG WITH TRANSITORY AREAS OF THE MAT TEMPLATES

FIG. 6

CONSTRUCTION TEMPLATES AND METHODS OF USE

FIELD OF THE INVENTION

The present invention relates generally to architectural and construction templates.

BACKGROUND

Conventional construction techniques entail reading and interpreting blueprints at the jobsite, then translating and transcribing specifications from the blueprints into instructions for constructing a building. The translation/transcription process typically involves a surfeit of measuring and marking construction materials and structures. The marks are typically made with pencils or other marking utensils, and by "snapping lines," i.e. using chalk lines, familiar to one of ordinary skill in the art, to make substantially straight lines. Construction personnel use the marks and lines to show the locations, where construction materials are cut, affixed, or assembled, to construct a building according to the specifications in the blueprints.

The translation/transcription process involves repeatedly inspecting blueprints, interpreting the information contained therein, and marking materials and structures as described above. This procedure is time consuming and error prone. Moreover, blueprints sometimes contain errors that are not identified until a building component has been assembled or installed according to the erroneous blueprint specifications. Serious flaws that are costly or practically impossible to correct are not uncommon. The result is decreased construction quality and increased cost, In addition, the conventional marking procedure is subject to unpredictable accuracy that can vary depending on the abilities and judgment of the tradesmen making the marks. The aforementioned problems with erroneous blueprints and translation/transcription mistakes and inaccuracy are frequently exacerbated by pressure to complete building construction under time constraints.

Building construction, particularly residential construction, usually involves building numerous internal and external walls. Many walls are constructed primarily with 2 by 4 or 2 by 6 boards. With typical conventional construction, the substantially exact locations of primary wall components are marked on a top plate and bottom plate (collectively referred to as wall plates) of a nascent wall. Wall plates are usually 2 by 4 or 2 by 6 boards.

To facilitate marking the wall plates, one each of the top plate and the bottom plate are typically laid on edge, oriented parallel and side by side, with two of their width sides touching. Subsequently, the locations of primary wall components, derived substantially extemporaneously from blue prints, are marked on one set of edges of the paired wall plates, with a pencil or other marking utensil. A tape measure or other measuring device is typically used to determine the locations of the marks. The wall plates are then separated and the building wall is assembled with the primary wall components being nailed or otherwise fastened to the wall plates at the locations marked on the wall plates. The measuring and marking of wall plates described above is laborious, time consuming, and prone to translation/transcription and accuracy errors as described above.

Subsequent installation of assembled walls, as well as other construction components, is typically performed using additional marks and lines made on the floor of a nascent building. Generating those marks and lines is also subject to translation/transcription and accuracy errors as described above.

Prior to completion of the exterior walls and roof of a building, the nascent building is vulnerable to water damage resulting from wet weather. Building floors are particularly vulnerable to damage caused by water that seeps between, or soaks into, sheets of plywood. The plywood itself can be damaged or water can infiltrate and damage adhesive used to fasten the plywood to floor trusses. Finished floors that squeak when walked on are one common result of such water damage.

Nascent buildings are also vulnerable to contamination by construction debris. Dust from drywall installation, sawdust, and residue from fiberglass insulation are particularly problematic because they can be difficult to remove effectively. Construction cleanup frequently focuses on gross construction debris, and considerable amounts of fine residue can persist after finishing. Wall spaces, ducts, attic spaces, sub-floors, and other inconspicuous building spaces therefore often contain significant contamination that can invade the habitable space of the completed building. Contaminants can thus act as irritants and allergens for building inhabitants.

BRIEF DESCRIPTION OF THE DRAWINGS

FIG. 6 is a flow chart for a method of constructing a building using mat templates, according to one embodiment of the present invention.

DETAILED DESCRIPTION

Figure 1:
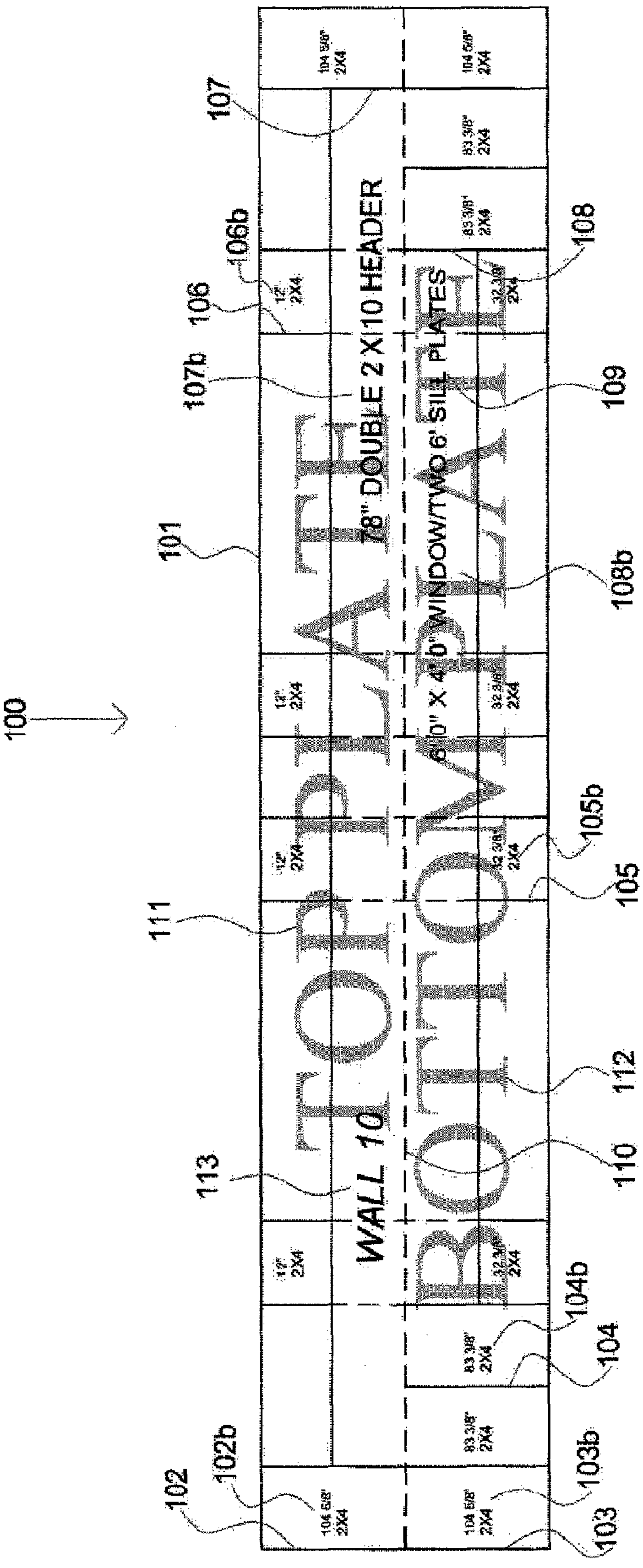
FIG. 1 is a top view of a strip template, according to one embodiment of the present invention.

Embodiments of the present invention include full size construction templates that provide building specifications for building construction, and protect a nascent building from moisture and construction debris. The present invention is applicable to both residential and commercial construction of both habitable and non-habitable building. Embodiments of the building specifications comprise depictions of substantially exact locations where building components are to be installed, printed on substantially dimensionally stable material. Embodiments of the present invention are typically themselves affixed to the building or building components. For depictions of substantially exact locations to function properly, the construction templates must be affixed to the building or building component substantially accurately, in substantially exact position and orientation. Embodiments of construction templates are typically adapted to such substantially accurate and exact positioning using techniques such as, but not limited to guide marks printed on the construction templates that correspond to specific locations on the building or building components. Typically, corners and edges of the construction templates also serve as guides for substantially accurate and exact positioning of the construction templates.

The building specifications also comprise other indicia of building construction, most of which are familiar to one of ordinary skill in the art, to be referred to by construction personnel at a job site. Examples of the substantially dimensionally stable material include, but are not limited to, flexible, durable, non-woven, fabric such as Tyvek®. Tyvek® is composed of spun, randomly distributed, non-directional, high-density polyethylene fibers that are bound together using heat and pressure, and is a proprietary product of E. I. du Pont de Nemours and Company or its affiliates. Typically, the construction templates that constitute elements of embodiments of the present invention are of two general types; strip templates and mat templates. Some embodiments of the present invention comprise systems for building construction that use strip templates or mat templates. Other embodiments comprise methods of construction that utilize strip templates or mat templates.

Typical embodiments of the present invention involve aligning wall plates as in conventional construction; on edge, oriented parallel and side by side, their width sides touching. At this stage, in contrast to conventional construction methods, the present invention typically involves affixing a strip template to one pair of edges of the paired wall plates, at substantially exact location and orientation. In some variations, each strip template attaches to just one wall plate instead of one strip template for a pair of wall plates. In other variations, pairs of the wall plates are not generated, and each strip template is affixed to an individual wall plate. In still other variations, the strip template is affixed to the width side of the wall plate. Devices for affixing the strip template include, but are not limited to, adhesives tape, staples, nails, brads, and clamps.

A typical embodiment of a strip template runs the length of the wall under construction, or a section thereof, and is about 3 inches wide, that width being about the thickness of the paired 2 by x wall plates. The strip template typically comprises depictions of the substantially exact locations of primary wall components printed on a substantially dimensionally stable material. The depictions are generally analogous to the marks typically made on the wall plates with a marking utensil in conventional construction.

A typical embodiment of a strip template also comprises additional construction specifications, including indicia pertaining to other building components, such as, but not limited to, electrical system components, plumbing system components, headers, window sill plates, other rough opening components, joists, trusses, hangars, braces, posts, beams, bolts, and pockets, as would be familiar to one of ordinary skill in the art.

Prior to separating the wall plates and constructing the building wall, the strip template is typically cut substantially in half along a line substantially parallel to or coexistent with the strip template's longitudinal axis. Consequently, upon separation, the top plate and the bottom plate each retain construction specifications on their respective strip template fractions. Embodiments of the present invention include variations wherein the construction specifications borne by the top plate and the bottom plate of the wall plate pair are identical, as well as variations where the construction specifications borne by the top plate differ from the construction specifications borne by the bottom plate, as would be appreciated by one of ordinary skill in the art.

Other embodiments of strip templates are adapted to attach to load bearing structures, such as, but not limited to, beams, rim boards, joists, trusses, foundation walls, foundation sill plates, load bearing walls, or other structures familiar to one of ordinary skill in the art. Such embodiments of strip templates comprise placement indicia pertaining to building components that attach to the load bearing structures. Variations of these embodiments further comprise descriptive indicia. Still other embodiments of strip templates are adapted to attach to non-load bearing structures, including, but not limited to, non-load bearing walls.

Embodiments of strip templates include color coding schemes whereby specific boards are depicted by specific colors. For instance, studs of a specific length are depicted on a strip template by use of a first color, studs of a different specific length are depicted by a second color, trimmers of a specific length are depicted by a third color, trimmers of a different specific length are depicted by a fourth color, cripples of a specific length are depicted by a fifth color, bearing blocks of a specific length are depicted by a sixth color, etc. Boards corresponding to their depictions on the strip template are marked with their respective color, and can therefore be installed without additional measuring after the boards are cut and color coded. This type of color coding scheme is most beneficial where boards of the same size are used repeatedly throughout a building. In some embodiments the boards are cut and color coded at the job site. In other embodiments the boards are cut and color coded at a manufacturing facility other than the job site. Embodiments of the present invention that use a color coding scheme are not illustrated in the drawings included with this application because black and white drawings fail to adequately illustrate the color coding. The color coding scheme proposed here, and its advantages, are readily appreciated by one of ordinary skill in the art, given the benefit of this disclosure.

Some embodiments of the present invention comprise applying and affixing the strip template to the paired wall plates using a strip template application tool. Typically, the strip template application tool stores the strip template in a rolled or folded configuration. The strip template application tool is typically used to apply and affix the strip template to the paired wall plates, and substantially concurrently cut the strip template substantially in half along a line substantially parallel to or coexistent with the strip template's longitudinal axis. In some embodiments the strip template application tool applies a strip template that comprises an adhesive backing, wherein the strip template application tool functions similarly to a packing tape dispenser. In some embodiments, the strip template application tool delivers fasteners, such as staples or nails, to affix the strip template as it is applied. Variations include a strip template application tool that delivers fasteners on both sides of a line that approximates the longitudinal axis of the strip template; such fastener distribution facilitates dividing the strip template substantially in half down a line substantially parallel to or coexistent with the longitudinal axis, as can be advantageous in wall construction.

Embodiments of strip templates typically convey more information than is practical to transcribe onto wall plate edges with convention construction methods. In addition, embodiments of strip templates offer numerous other advantages over conventional construction methods, including, but not limited to, increased speed, accuracy, and precision, as detailed below:

Embodiments of strip templates comprise printing that is accurate and highly reproducible; construction specifications are printed with sustainable accuracy typically not achievable when marking by hand.

- Embodiments of strip templates are typically systematically pre-printed before use, employing relatively error resistant methods for transcribing construction specifications from blue prints; such systematic printing reduces errors, particularly random transcription errors such as those incurred where personnel derive construction specifications from blue prints extemporaneously at the job site.
- Construction of building walls using embodiments of strip templates is usually faster than when marking by hand.
- Blueprint errors are readily identified and corrected during systematic transcription/translation of data from blueprints to strip templates.

Embodiments of the present invention also include using one or more mat templates to assist and improve building construction. Functions of the mat template embodiments include, but are not limited to, (i) indicating the substantially exact locations for installing building components, (ii) providing other construction specifications, (iii) protecting floors and other building components from water or weather damage during building construction, and, (iv) providing a barrier to, and containment for, construction debris that could otherwise contaminate or infiltrate a building under construction.

Embodiments of mat templates typically comprise construction specifications printed on substantially dimensionally stable material. The construction specifications typically comprise depictions of the substantially exact locations where building components are installed. The depictions are typically, but not necessarily, full scale representations of the footprints of the building components. Other construction specifications, including descriptive indicia pertaining to building components, are also represented on the mat style construction templates. The building components include, but are not limited to; walls, stairs, doors, windows, cabinets, fixtures, appliances, safety lines, apertures, flu chases, fireplaces, floor coverings, wall coverings, decorative components, electrical system components, plumbing system components, headers, joists, trusses, hangars, braces, posts, beams, bolts, pockets, foundations, and foundation sill plates. Embodiments of the mat templates thus serve as maps of portions of a building. Variations of the construction specifications include other construction indicia familiar to one of ordinary skill in the art. Typically, embodiments of mat templates convey more information than is practical to transcribe onto a floor with conventional construction methods.

Typically, rolls of the substantially dimensionally stable material are about 9' wide, although other widths may be used. Multiple 9' wide mat templates are typically laid side by side to cover a substantially entire floor of a nascent building. In a typical embodiment, one or more mat templates is affixed to one or more floors of a nascent building after the floor has been installed, but before additional building components are installed on the floor. Typically, the mat template is aligned on the floor according to guide marks printed among the construction indicia on the mat template, and corresponding points on the floor.

Embodiments of the mat templates act as moisture barriers, to protect the nascent building from water damage resulting from wet weather that sometimes occurs before the nascent building becomes substantially weather-tight. The typical substantially water resistant mat template covers the floor and thereby diverts most water that might otherwise wet the floor or other building components. In some embodiments of the present invention, adjacent mat templates are taped together, or otherwise sealed in order to prevent moisture from getting between the mat templates to wet the building.

With conventional construction methods, building components are typically substantially unprotected from wet weather, and are consequently often exposed to damaging quantities of water. In contrast to embodiments of the present invention, other construction templates that are installed temporarily, and are thus removed before the building becomes weather-tight, do not offer substantial protection from wet weather. Construction templates that serve as stencils to apply indicia to floors or walls also do not offer substantial protection from wet weather.

Embodiments of the mat templates also act as debris barriers, to protect the nascent building from contamination by construction debris, such as, but not limited to, dry wall dust, sawdust, and fiberglass insulation residue. In the absence of debris barriers, the construction, debris, especially fine debris such as drywall dust, sawdust, and fiberglass insulation residue can infiltrate the nascent building and persist in the building after construction is complete. Such persistent construction debris can cause or exacerbate allergies and other health problems for inhabitants of completed, contaminated buildings. Acting as a barrier that is substantially impenetrable to fine construction debris, the mat template reduces infiltration of construction debris and effects its thorough removal. In a typical embodiment, residual construction debris that might otherwise escape recovery is contained by, and disposed of with, provisional areas of the mat templates that are removed and discarded upon substantial completion of building construction. In one embodiment of the present invention, one or more borders of the provisional areas of the mat templates are perforated to facilitate removal of those areas. In other variations, the provisional areas are excised with a cutting instrument such as a knife or scissors.

In addition, to acting as water and debris barriers, embodiments of mat templates provide other advantages over conventional construction methods, including, but not limited to, increased accuracy and precision, as detailed below:

- Embodiments of mat templates comprise printing that is accurate and highly reproducible; construction specifications are printed with sustainable accuracy typically not achievable when marking by hand.
- Embodiments of mat templates are typically systematically pre-printed before use, employing relatively error resistant methods for transcribing construction specifications from blue prints; such systematic printing reduces errors, particularly random transcription errors such as those incurred where personnel derive construction specifications from blue prints extemporaneously at the job site.
- Blueprint errors are readily identified and corrected during systematic transcription/translation of data from blueprints to mat templates.

In order to provide figures that are readily legible, embodiments of the construction templates illustrated in the figures provided herein show fewer construction specifications than is typically shown by actual, full scale construction templates. Thus it is to be appreciated that actual full scale construction templates are typically more detailed, with more construction specifications printed thereon, than the examples provided by these figures contained herein.

In contrast to embodiments of the present invention, construction templates that are installed temporarily, and are thus removed before construction is substantially complete, do not offer substantial protection from construction debris.

Similarly construction templates that serve as guides for stenciling indicia to floors or walls, also do not offer substantial protection from construction debris.

Embodiments of the present invention include variations whereby strip templates or mat templates comprise codes printed on the templates, the codes being linked to specifications for cutting dimensional lumber to the proper length. For instance, if WALL X requires two 96" long 2 by 4 boards and six 92⅝" long 2 by 4 boards for its assembly and installation in a building, the strip template for WALL X comprises a code linked to specifications for those boards. Entering the code in an appropriate system elicits those specifications in a manner familiar to one of ordinary skill in the art. Variations of code systems contemplated herein include, but are not limited to, alpha-numeric codes and bar codes. In some embodiments, bar codes imprinted on strip templates for walls is scanned at a panel shop, where boards for the walls are cut according to the elicited specifications. Lumber is typically cut more rapidly and accurately at a panel shop than at the job site.

Terminology

The terms and phrases as indicated in quotation marks ("") in this section are intended to have the meaning ascribed to them in this Terminology section applied to them throughout this document, including in the claims, unless clearly indicated otherwise in context. Further, as applicable, the stated definitions are to apply regardless of the word or phrase's case to the singular and plural variations of the defined word or phrase.

The term "or" as used in this specification and the appended claims is not meant to be exclusive; rather the term is inclusive meaning "either or both".

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least one embodiment or variation of the invention. The phrases "in one embodiment", "in one variation" or similar phrases, as used in various places in the specification, are not necessarily meant to refer to the same embodiment or the same variation.

The terms "provisional area" or "provisional areas" refer to portions of mat templates on which building components are not to be installed. Provisional areas are thus accessible to be removed after building construction is substantially complete. Provisional areas contrast with "enduring areas," on which building components are installed or to be installed, and which are not removed from the completed building.

The terms "translate from" or "translated from" means deciphered from, interpreted from, or calculated from. For example, the length of a cripple or a trimmer in a wall may be readily "translated from" a blueprint, though indicia explicitly identifying the length of the cripple or trimmer is not present in the blueprint.

The term "durable" refers to material or construction templates that can typically withstand weeks to months of outdoor exposure without significant degradation. Tyvek® is an example of durable fabric. Uncoated paper or cardboard are examples of material that typically is not durable. A construction template comprising Tyvek® that is imprinted with water-resistant, indelible ink is an example of a durable construction template. The preceding examples are not exclusive; durable materials and construction templates are not limited to these examples.

The term "nascent" refers to a building or building component under construction.

The term "indicia" refers to qualitative or quantitative descriptors or depictions of building components, assemblies, systems, or procedures. Forms of indicia include, but are not limited to lines, data, formulae, dimensions, text and symbols.

The term "placement indicia" refers to a subset of indicia that depicts, in full scale, the substantially exact positions or orientations where building components are to be installed. For example, where placement indicia depict the locations where kitchen cabinets align when attached to the floor of a building, the placement indicia show full scale depictions of cabinet footprints. Distances among cabinets, as well as between cabinets and other building components that set on the floor when installed, are also shown in full scale by placement indicia. Similarly, where placement indicia show where primary wall components align when attached to wall plates, placement indicia show the distances between primary wall components in full scale. As would be obvious to one of ordinary skill in the art, the thickness of any studs, trimmers, or cripples, usually about 1½", is also typically shown in full scale.

The term "descriptive indicia" refers indicia other than placement indicia.

The phrases "2 by 4", "2 by 6", or "2 by x" refers to wood boards whose dimensions are nominally 2"thick by 4", or 6", or x", respectively, wide. For finished boards typically used at the construction site, the actual size is smaller than the stated, nominal dimension. Thus a 2 by 4 board is actually about 1½" thick by about 3½" wide, and 2 by 10 board is actually 1½" thick by about 9¼" wide. "2 by x" or "2 by" refers to boards whose thickness is about 1½" and whose width is any common, or an undetermined, size.

The term "width side" refers to the either of the sides of a board with a width dimension as opposed to a thickness or length dimension. For instance, a 10'2 by 4 board, which is actually about 1½"×3½", has a length dimension of about 10 ft, a thickness dimension of about 1½"; and a width dimension of about 3½". The sides of the board that are about 3½" across are the width sides. Similarly, a 2 by 8 board (actually about 1½"×7¼") has a width dimension of about 7¼".

The terms "primary wall component" or "primary wall components" refer to wall components, familiar to one of ordinary skill in the art, that affix primarily directly to a top plate or a bottom plate of a typical wall. Bottom plates are sometimes referred to as sole plates in the construction industry. Typical primary wall components include, but are not limited to, studs, trimmers, cripples, and headers.

The terms "secondary wall component" "secondary wall components" refer to wall components that do not affix primarily directly to a wall plate. Typical secondary wall components include, but are not limited to, windows, sill plates, and door frames. As would be appreciated by one of ordinary skill in the art, the legs of door frames may be affixed to a bottomed plate, but the door frame is primarily attached to studs or trimmers.

The terms "floor" or "floors" generally refer to building floors or sub floors. Typically, a plywood sub-floor is assembled on floor joists or other substrate, and forms a structural surface on which a finished floor is installed. A concrete sub-floor is typically installed in a basement, and often does not have a finished floor installed over it. In typical residential construction, the walls of a structure are often installed setting on the floor.

The terms “install,” “installed,” or “installation” refer to placing building components substantially permanently in their final positions and orientations within a structure. “Install,” “installed,” or “installation” can include assembly and construction. Thus the rough opening for a window can be “installed” in a wall by constructing the rough opening as an integral part of the wall. Or, alternatively, a manufactured window assembly may be “installed” in a wall merely by securing the window assembly in place in the wall. In either case, the component is “installed,” i.e., substantially permanently placed in the wall, even though the wall itself may not yet be installed in the building.

The terms “building” or “buildings” refer to the noun or adjective forms of the word, not the verb form. Thus, an actor constructs a building, or installs building components. As used, herein, the actor is constructing a building, but not building a structure.

The terms “print,” “printing,” “printed,” or “printed on” refer to imparting material with symbols or text by any method. These terms thus refer to methods such as, but not limited to, printing, sublimation, dying, impregnating, imbuing, suffusing, or any other method of imparting material with symbols or text.

The term “longitudinal axis” refers to a straight line that runs along the template’s length, from one end to the other, about which the template is symmetrical and may be conceived to rotate. A longitudinal axis bisects a template along the template’s length.

The term “load bearing structure” refers to structures such as, but not limited to, beams, joists, trusses, engineered wood products, posts, jacks, walls, foundations, and foundation sill plates, that carry a load substantially greater than the weight of the structure itself.

A First Embodiment Strip Template

A first embodiment strip template 100 is illustrated in FIG. 1. FIG. 1 is not drawn to scale. The first embodiment strip template comprises an approximately 3"wide, at least 69"long, strip of flexible, durable, substantially dimensionally stable material 101 on which is printed construction specifications for a 69"long section of a 109⅛" tall 2 by 4 wall. The first embodiment construction specifications comprise indicia pertaining to primary wall components as follows:

- a depiction of a substantially exact location on the edge of a top plate where the top of a 104⅝" long 2×4 stud aligns 102 when affixed to the top plate, and a brief description of that stud 102*b;*
- a depiction of a substantially exact location on the edge of a bottom plate where the bottom of that same stud aligns 103 when affixed to the bottom plate, and a brief description of that stud 103*b;*
- a depiction of a substantially exact location on the edge of a bottom plate Where an 83 ⅜" long 2×4 trimmer aligns 104 when affixed to the bottom plate, and a brief description of that trimmer 104*b;*
- a depiction of a substantially exact location on the edge of a bottom plate where a 32⅜" long 2×4 cripple aligns 105 when affixed to the bottom plate, and a brief description of that cripple 105*b;*
- a depiction of the substantially exact location on the edge of a top plate where an 12"long 2×4 cripple aligns 106 when affixed to the top plate, and a brief description of that cripple 106*b*.

The first embodiment construction specifications further comprise indicia pertaining to secondary wall components as follows:

- a depiction of the substantially exact location along the length of the wall where a 78"header aligns 107 when installed in the wall, and a brief description of the 78"header, which is assembled from two 78"long 2 by 10 boards 107*b;*
- a depiction of the substantially exact location along the length of the wall where a 6'×4', window aligns 108 when installed in the wall, and a brief description of that window 108*b;*
- a brief description of two 6'long sill plates 109 that reside below the window and above the 32⅜" cripples. As would be obvious to one of ordinary skill in the art, the location of the sill plates along the length of the wall is substantially identical to the location of the window 108.

The first embodiment of the present invention further comprises (i) a dashed line delineating the top plate from the bottom plate 110, and, (ii) labels identifying sections of the strip template corresponding to the top plate 111 and bottom plate 112, respectively. Indicia identifying a particular wall 113 are typically printed on the strip type template. In some embodiments, a corresponding indicia on a corresponding mat template show where the wall is installed in the building.

The first embodiment strip template comprises substantially all information necessary for one skilled in the art to assemble this section of wall. That a second top plate is added to the wall is obvious to one of ordinary skill in the art, despite the absence of indicia pertaining to the second top plate on the first embodiment strip template. Some embodiments of strip templates further comprise indicia pertaining to the second template. The substantially exact location where primary wall components affix to the wall plates is explicitly depicted in on the strip template. From the construction specifications presented collectively on the first embodiment strip template, the locations of the header and window in the assembled wall is obvious to one of ordinary skill in the art.

A Second Embodiment Strip Template

Figure 2:
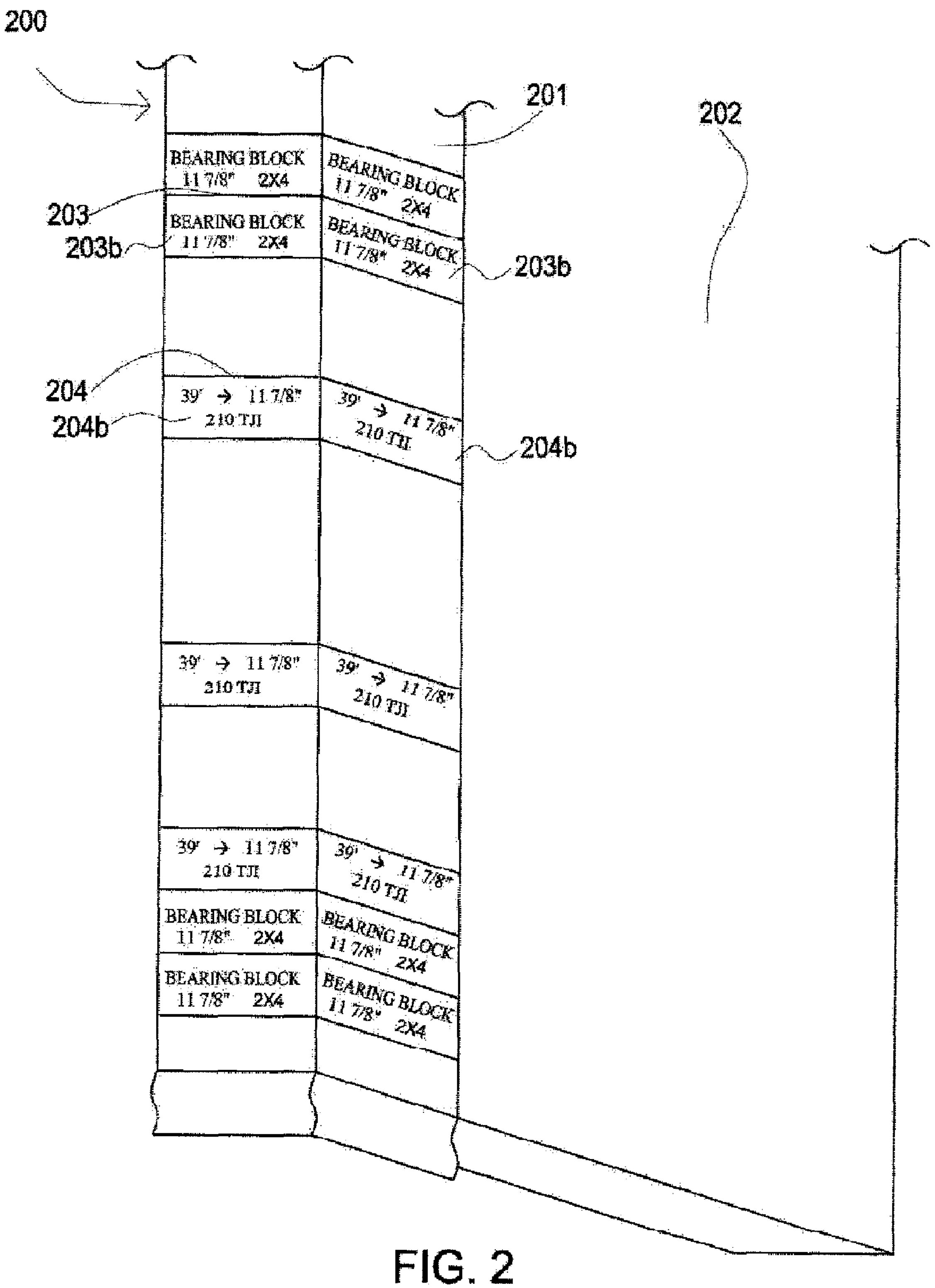
FIG. 2 is an isometric view of a section of a strip template affixed to a section of a rim board, according to another embodiment of the present invention.

A second embodiment strip template 200 is illustrated in FIG. 2. FIG. 2 is not drawn to scale. The second embodiment strip template comprises a strip of flexible, durable, substantially dimensionally stable material 201 on which are printed construction specifications pertaining to construction components that attach to a rim board 202. FIG. 2 shows a section of the strip template 200 attached to the top of a section of the rim board 202. In one embodiment the rim board is about 1¼" thick and the strip template is about 3"inches wide; thus the strip template extends across the top and approximately 1¾" down one side of the rim board. Other embodiments of the strip template are wider or narrower.

The second embodiment construction specifications comprise indicia pertaining to construction components as follows:

- a depiction of a substantially exact location where an 11⅞" long 2×4 bearing block aligns 203 when affixed to the rim board, and brief descriptions of that bearing block 203*b;*
- a depiction of a substantially exact location where a 11⅞" tall 39'long model 210 TJI® joist aligns 204 when affixed to the rim board, and brief descriptions of that TJI® joist 204*b*. TJI® joists are proprietary engineered wood products from the Weyerhaeuser Company.

Third Embodiment Mat Templates

Figure 3:
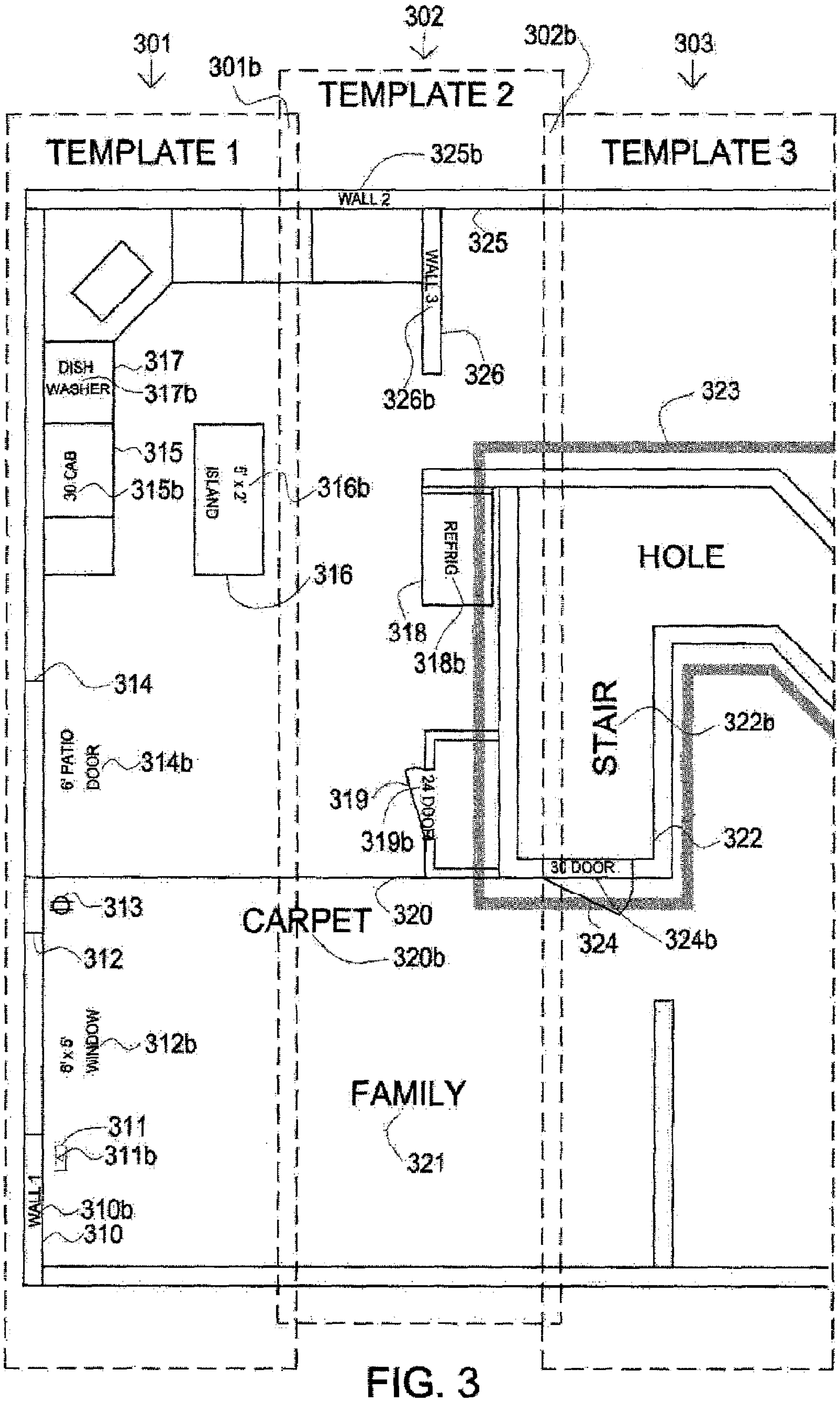
FIG. 3 is a top view of three mat templates according to one embodiment of the present invention.

A third embodiment set of mat templates comprising mat template 1 301, mat template 2 302, and mat template 3 303, is illustrated in FIG. 3. FIG. 3 is not drawn to scale. Collectively, the 3 mat templates show a partial floor plan of 1 story of a residential building. Each of the 3 mat templates comprises construction specifications printed on substantially dimensionally stable material. FIG. 3 shows mat templates 1, 2, and 3 laid out in substantially exact position on a floor of a nascent residential building. Mat templates 1 and 2 typically overlap each other by about 6"301*b*, and mat templates 2 and 3 also typically overlap by about 6"302*b*, but the amount of overlap is not critical and can vary from no overlap to greater than 6". In one variation of the third template, the mat templates are about 9'wide. Embodiments of different widths are also contemplated.

Collectively, the three mat templates of the third embodiment comprise construction specifications as follows:

- indicia depicting the substantially exact location where "WALL 1" aligns 310 when affixed to the floor, and text identifying WALL 1 310*b*. In some embodiments, one or more corresponding strip templates provide construction specifications for assembling WALL 1;
- indicia depicting the substantially exact location where a heat vent aligns 311 when installed in the floor, and a symbol identifying the component as a heat vent 311*b;*
- indicia depicting the approximate location where a 6'by 5'window aligns 312 when installed in WALL 1, and a brief description of that window, 312*b;*
- indicia symbolizing the approximate location where a 110 V outlet is installed in WALL 1 313; the symbol signifies a 110 V duplex outlet;
- indicia depicting the substantially exact location where a 6'tall patio door aligns 314 when installed in WALL 1, and a brief description of that door 314*b;*
- indicia depicting the substantially exact location where a 30"cabinet aligns 315 when installed, and a brief description of that cabinet 315*b;*
- indicia depicting the substantially exact location where a kitchen island aligns 316 when installed, and a brief description of that island 316*b;*
- indicia depicting the substantially exact location where a dishwasher aligns 317 when installed, and a brief description of that appliance 317*b;*
- indicia depicting the substantially exact location where a refrigerator aligns 318 when installed, and a brief description of that appliance 318*b;*
- indicia depicting the substantially exact location where a 26"rough opening for a 24"door to a pantry aligns 319 when installed, and a brief description of that door 319*b;*
- indicia depicting the substantially exact location where the family room floor covering meets the kitchen floor covering 320, and a brief description of the family room floor covering 320*b*
- indicia identifying the family room 321;
- indicia depicting the substantially exact location where a hole for stairs aligns 322 when installed, and a brief description of that hole 322*b;*
- indicia depicting a safety line that circumscribes the stair hole 323. In some embodiments of the invention, the line is bright red or yellow;
- indicia depicting the substantially exact location where a 32"rough opening for a 30"door to stairs aligns 324 when installed, and a brief description of that door 324*b;*
- indicia depicting the substantially exact location where "WALL 2" aligns 325 when affixed to the floor, and text identifying WALL 2 325*b*. In some embodiments, one or more corresponding strip templates provide construction specifications for assembling WALL 2;
- indicia depicting the substantially exact location where "WALL 3" aligns 326 when affixed to the floor, and text identifying WALL 3 326*b*. In some embodiments, one or more corresponding strip templates provide construction specifications for assembling WALL 3.

For embodiments of the invention that comprise strip templates, WALL 1, WALL 2, AND WALL 3 are shown in greater detail on their respective strip templates.

A Fourth Embodiment Strip Template Application Tool

Figure 4:
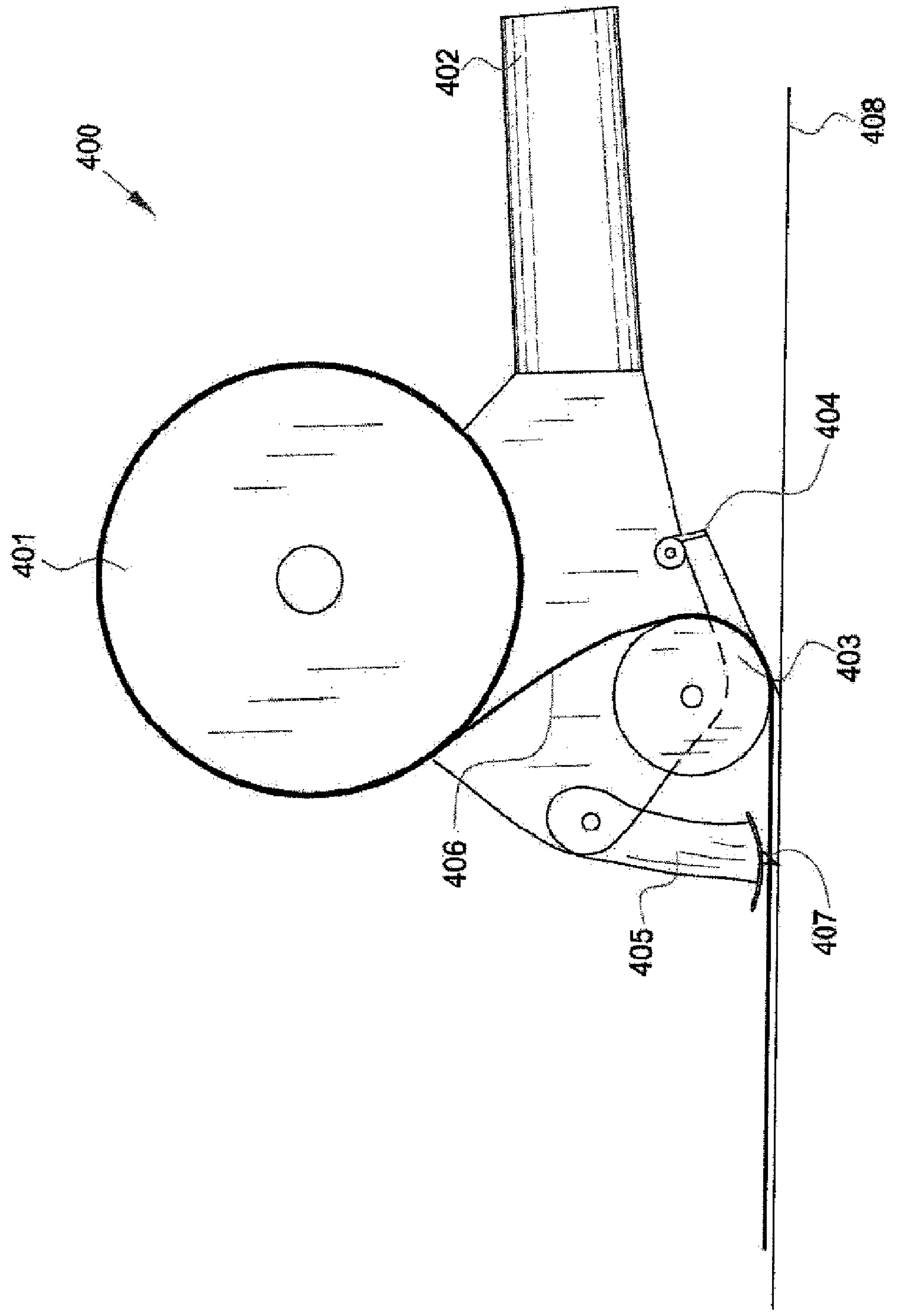
FIG. 4 is an isometric view of a strip template application tool according to one embodiment of the present invention.

A fourth embodiment strip template application tool 400 is illustrated in FIG. 4. The fourth embodiment strip application tool comprises, (i) a spool 401, (ii) a handle 402, (iii) a secondary roller 403, (iv) a pressure plate 404, and, (v) a template modification assembly 405. A strip template 406 is loaded in the strip template application tool on the spool, and runs between the secondary roller and the pressure plate for delivery to a wall plate or other construction component 408. The template modification assembly is equipped with a retractable cutting blade 407. The cutting blade is employed to cut the strip template substantially in half along a line substantially parallel to or coexistent with the strip template's longitudinal axis, substantially concurrently with applying the strip template to a pair of wall plates.

An embodiment of the template processing assembly 405 is fitted with a fastener gun (not shown) to enable fastening the strip template in place substantially concurrently with delivery and application of the strip template. The fastener gun delivers fasteners such as, but not limited to, staples, brads, or nails. Variations of the fastener gun deliver fasteners down both sides of the strip template so that the strip template halves stay attached to their respective wall plates when the strip template is divided as the wall plate pair is separated prior to assembling the nascent wall. In some embodiments, strip templates have adhesive backings that facilitate affixing the templates to construction components.

In still other embodiments, the strip template is folded rather than wound on the spool 401, and is loaded into a compartment (not shown) that replaces the spool on the strip template application tool. In other variations, the strip template application tool does not have a secondary roller 403 or a pressure plate 404.

A Fifth Embodiment Method for Constructing Building Walls Using Strip Templates

Figure 5:
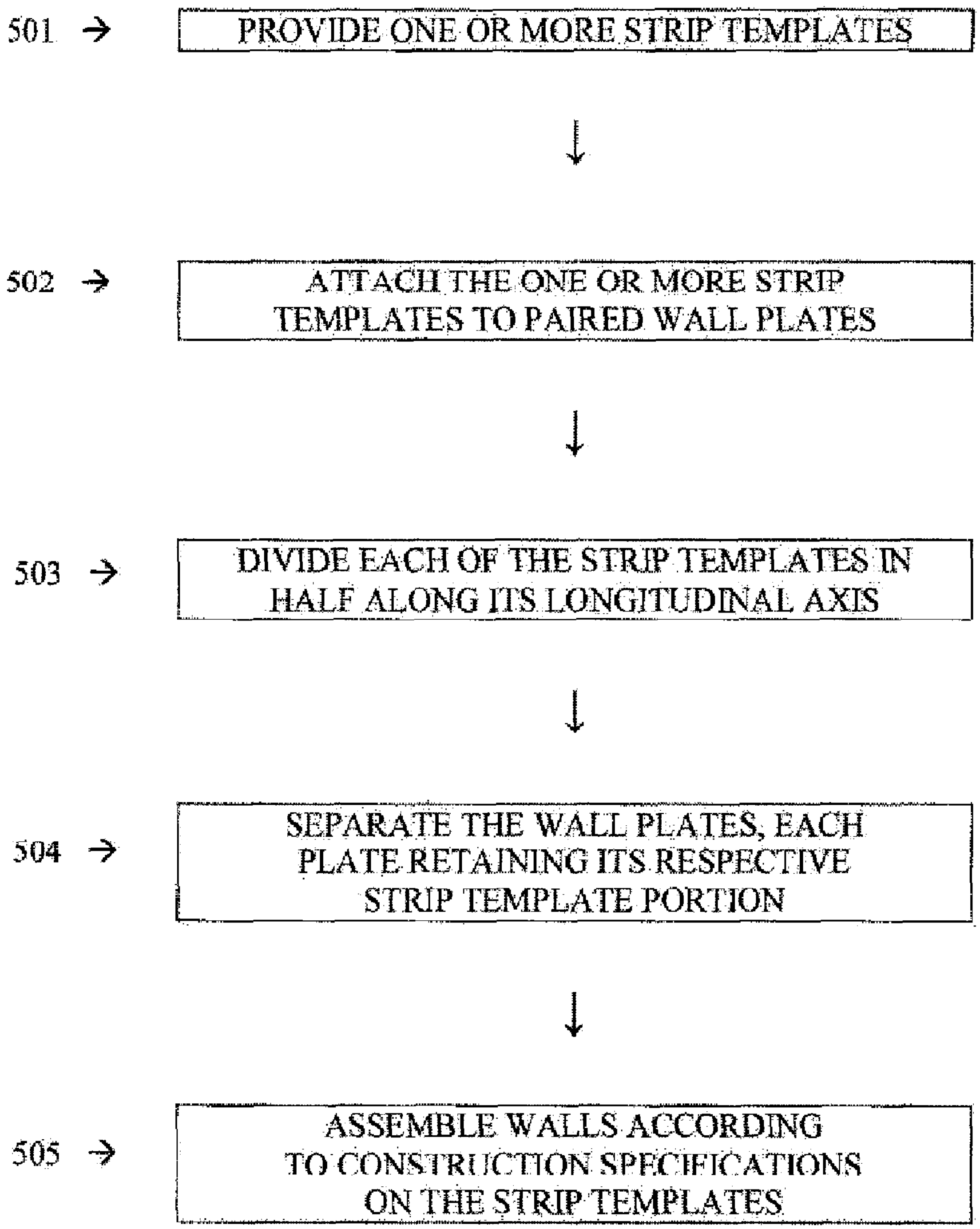
FIG. 5 is a flow chart illustrating a method of constructing building walls using strip templates, according to one embodiment of the present invention.

A fifth embodiment construction method comprises a method for constructing building walls using strip templates, as illustrated by a flow chart in FIG. 5. The first operation 501 comprises providing a strip template, the strip template comprising construction specifications printed on substantially dimensionally stable material. The construction specifications are typically, but not necessarily, derived from blueprints. Some construction specifications are typically transcribed verbatim from the blueprints to the strip template. Other construction specifications are typically translated from the blueprints.

The second operation comprises affixing the strip template in substantially exact position 502, to the edge side of paired wall plates. The paired wall plates are typically generated by laying a top plate and a bottom plate on edge, parallel, with 2 of their width sides in contact. In some embodiments of the present invention, the strip templates are applied with the aid of a strip template application tool.

The third operation comprises dividing the strip template along a line substantially parallel to or coexistent with the strip template's longitudinal axis, into two approximately equal halves 503. In some embodiments, the line along which the strip template is to be divided is perforated to facilitate dividing. In other embodiments, one or more of the templates is cut in half using scissors or a knife. In some other embodiments the strip templates are cut in half with a strip template application tool, substantially concurrently with being applied to the paired wall plates by use of the strip template application tool.

The fourth operation comprises separating the wall plates 504, with each top plate and each bottom plate retaining its respective strip template portion.

The fifth operation comprises assembling the wall in accordance with the construction specifications on the strip template 505. Primary wall components are affixed to one or both of the top plate and bottom plate from each wall plate pair, at the substantially exact locations indicated by the strip templates. Secondary wall components are then typically installed, usually affixed to one or more wall components, as indicated by the strip templates. Typically, the strip templates are left in place throughout construction and installation of building walls. Thus a typical embodiment of a strip template is not reusable. In some embodiments of the present invention, multiple copies of the same strip template are generated for identical walls designed to recur within a building, or among multiple buildings. In some embodiments of the present invention, the building walls are installed in the building according to construction specifications on one or more mat templates.

A Sixth Embodiment Method for Constructing A Building Using Mat Templates

Another embodiment construction method comprises a method for constructing a building using a mat template as illustrated in FIG. 6. The first operation 601 comprises providing a mat template, the mat template comprising construction specifications printed on substantially dimensionally stable material, such as, but not limited to, Tyvek®. The construction specifications are typically, but not necessarily, derived from blueprints. Some construction specifications are typically transcribed verbatim from the blueprints to the mat templates. Other construction specifications are typically translated from the blueprints.

The second operation 602 comprises affixing one or more mat templates to the building floors, each mat template being affixed to the floor at one substantially exact position and orientation. Typically, the substantially exact positioning of the mat template is accomplished through the use of a plurality of guide marks, included among the construction specifications printed on the mat template, that correspond to substantially exact locations on the building floor. Typically, though not necessarily, mat templates are about 9'wide, in which case numerous mat templates are required to cover an entire building floor. The plurality of guide marks also typically provides guidance for affixing adjacent mat templates in substantially exact position and orientation relative to one another.

The third operation 603 comprises sealing the edges of the mat templates to create a substantially water-resistant barrier that substantially protects the floor of the building from wet weather and construction debris. In one embodiment of the present invention, water resistant tape is used to seal the break between one or more adjacent mat templates. Other methods of sealing the mat templates, such as, but not limited to, adhesive strips on the edges of the mat templates, are also contemplated. In some variations, the edges of mat templates overlap the edges of adjacent mat templates. In some variations, the mat template is sealed to the floor. In yet other variations, the mat templates are not sealed.

The fourth operation 604 comprises installing one or more walls and other building components in accordance with construction specifications on the mat templates. Construction specifications on the mat template typically include references identifying one or more specific strip templates, as well as a side view of that wall. For instance, "WALL 10," marked on the mat template, indicates where wall number 10 is installed. A strip template, also identified as "WALL 10," instructs how to assemble the wall to be installed at the corresponding location on the mat template. A side view of wall number 10 is also typically depicted on the mat template near or adjacent to where wall number 10 is installed, providing further instruction or confirmation as to the correct assembly or installation of wall number 10.

Additional construction specifications typically show the substantially exact locations for installation of other building components. Other, additional construction specifications typically describe or instruct assembly or installation of other building components, at, above, or below, floor level. Construction specifications typically include additional marks and information not specifically related to assembly or installation of building components. The additional marks and information include, but are not limited, to safety lines around stair holes in the floor and safety lines near the perimeters of floors. Embodiments of the present invention that include decorative, non-functional, or advertising marks are also contemplated.

The fifth operation 605 comprises removing residual construction debris along with the provisional areas of the mat template. The provisional areas are typically excised with a utility knife or other cutting instrument. In other variations, the mat template has perforations at the perimeter of the provisional areas to facilitate removal of the provisional areas. Residual construction debris that escapes gross construction debris removal is readily removed with the excised provisional areas because the mat template substantially mitigates infiltration of the construction debris into porous building material.

A Seventh Embodiment Set of 6 Strip Templates

Figure 7:
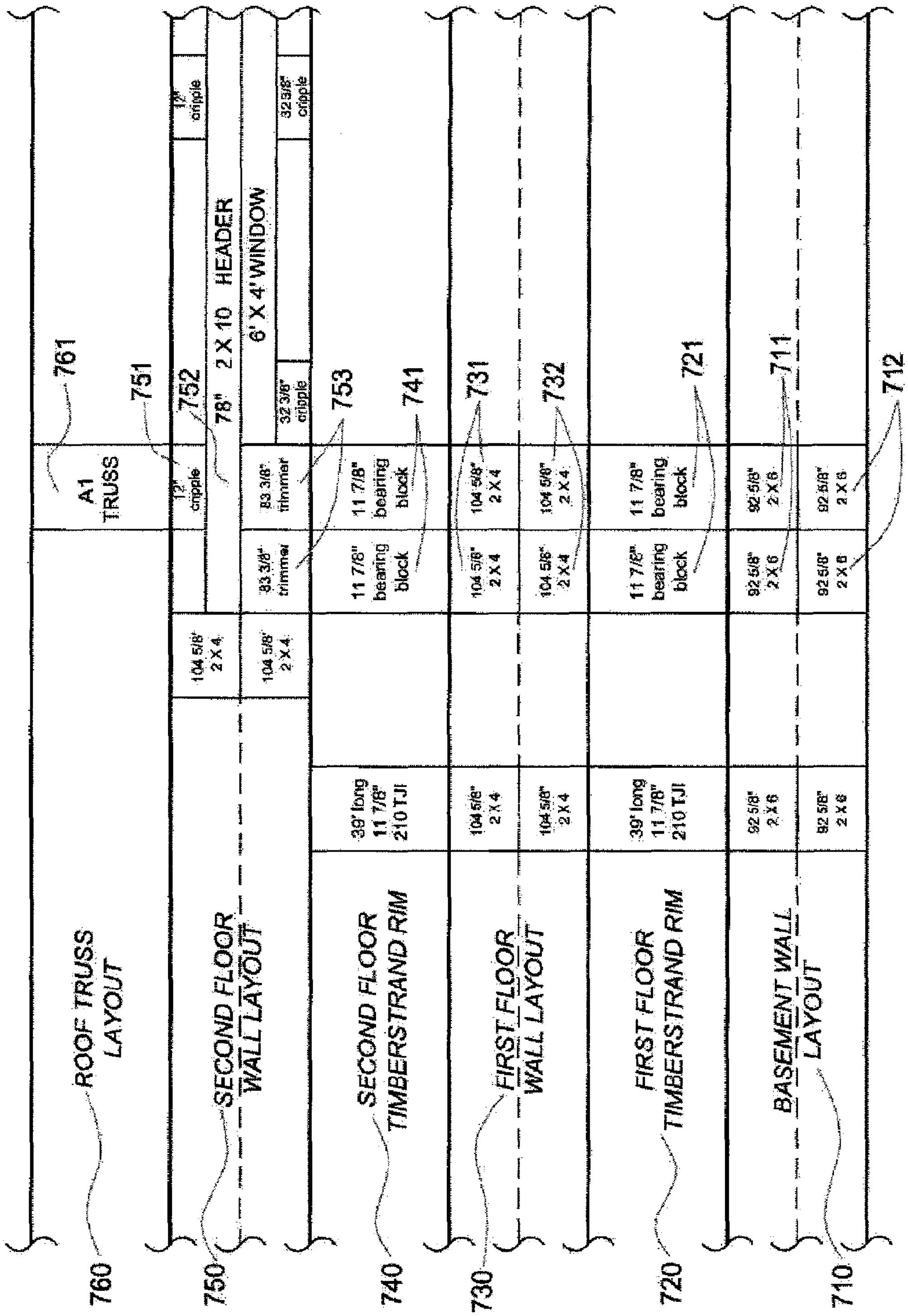
FIG. 7 is a top view of 6 strip templates, according to one embodiment of the present invention.

FIG. 7 illustrates how, according to one embodiment, a set of 6 strip templates is arranged to confirm that the templates are properly printed, and that loads in the building are properly aligned from the roof down to the foundation. Aligning strip templates according to this embodiment allows one to readily identify errors that lead to improperly supported loads. Sections of the 6 strip templates are illustrated as follows.

A strip template that depicts and describes wall components for constructing a basement wall 710 is aligned beneath a strip template that attaches to a first floor timberstrand rim 720, which is aligned beneath a strip template that depicts and describes wall components for constructing a first floor wall 730. A strip template that attaches to the second floor timberstrand rim 740 is aligned above the first floor wall strip template 720 and below a strip template that depicts and describes wall components for constructing a second floor wall 750. At the top is a strip template that depicts and describes the layout of roof trusses 760.

A location of an A1 truss is depicted and described 761 on the truss layout template 760. A 12"cripple is depicted and described where it is aligned when attached to a top plate 751, directly below the A1 truss, on the second floor wall template 750. The location of the second floor 12"cripple directly below the A1 truss facilitates transferring the load from the truss to the cripple.

The same transference of loads to building components directly below continues down through the building, and is illustrated by the strip templates: the 12"cripple is depicted and described directly above one end of a depiction/description of a 2×10 header 752, which is directly above depictions/descriptions of two 83⅜" trimmers 753. The header and trimmers are depicted and described on the second floor wall template 750 where they align when attached to a bottom plate 753. Directly beneath the 83⅜" trimmers are depictions/descriptions of two 11⅞" bearing blocks 741, directly beneath which are depictions/descriptions of two 104⅝" 2 by 4 studs. The 104⅝" 2 by 4 studs are depicted/described on the first floor wall strip template 740 where they align when attached to a top plate 731 and to a bottom plate 732. Directly beneath the 104⅝" 2 by 4 studs are depictions/descriptions of another two 11⅞" bearing blocks 721 on the first floor timberstand rim strip template 720, directly beneath which are depictions/descriptions of two 92⅝" 2 by 6 studs. The 92⅝" 2×6 studs are depicted/described on the basement wall strip template 710 where they align when attached to a top plate 711 and to a bottom plate 712. Aligning strip templates as described in this embodiment is a precautionary measure to identify errors in the strip templates before mistakes are made in actual construction. Strip templates are not so configured, one aligned beneath the other, when attached to construction components and in use to guide construction.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For instance, although the various embodiments of the present invention described above are generally adapted to constructing buildings using primarily dimensional lumber and "stick-built" construction techniques, embodiments are contemplated that are adapted to constructing buildings using other materials and techniques including, but not limited to, post and beam construction, post-frame construction, pole barn construction, concrete, polymeric blocks and forms adapted to holding concrete, metal beams, metal frame construction, metal studs, engineered wood products, polymeric building materials, composite building materials, prefabricated building assemblies and components, structurally insulated panels, straw bales, tires, adobe, brick, stone, glass and structural glass.

I claim:

1. A strip template comprising one or more construction specifications printed on a strip of substantially flexible material, the one or more construction specifications comprising:

a top wall configuration, the top wall configuration comprising placement indicia illustrating the substantially exact location where one or more primary wall components are aligned when attached to a top plate; and a bottom wall configuration, the bottom wall configuration comprising placement indicia illustrating the substantially exact location where one or more primary wall components are aligned when attached to a corresponding bottom plate, the top plate and the corresponding bottom plate being components of the same wall, and the top wall configuration differing from the bottom wall configuration.

2. The strip template of claim 1, wherein the one or more construction specifications further comprise descriptive indicia.

3. The strip template of claim 1, wherein:

the top wall configuration is printed on a first sector of the strip template; and the bottom wall configuration is printed on a second sector of the strip template; and the first sector of the strip template is delineated from the second sector of the strip template along a line substantially parallel to or coexistent with a longitudinal axis of the first template.

4. The strip template of claim 3, wherein the one or more construction specifications further comprise descriptive indicia.

5. One or more mat templates comprising one or more construction specifications printed on flexible, durable, substantially dimensionally stable material, the one or more mat templates being (i) substantially water-resistant, and, (ii) adapted to being substantially sealed, the substantially sealed one or more mat templates forming a substantially water resistant barrier above one or more floors of the building, and the one or more construction specifications comprising placement indicia illustrating the substantially exact location for installation of one or more building components on one or more of the one or more floors of a building.

6. The one or more mat templates of claim 5, further comprising a non-skid surface.

7. The one or more mat templates of claim 5, wherein the one or more mat templates are adapted to align substantially accurately on one or more building floors, in substantially exact position and orientation on the building floor.

8. The one or mat templates of claim 7, wherein the one or more construction specifications further comprise guide marks.

9. The one or mat templates of claim 5, further comprising one or more enduring areas.

10. The one or more mat templates of claim 9, further comprising one or more provisional areas.

11. A method of constructing a building wall comprising:

providing one or more strip templates, the one or more strip templates comprising one or more construction specifications printed on a strip of substantially flexible material, the one or more construction specifications comprising (i) a top wall configuration, the top wall configuration comprising placement indicia illustrating the substantially exact location where one or more primary wall components are aligned when attached to a top plate, and, (ii) a bottom wall configuration, the bottom wall configuration comprising placement indicia illustrating the substantially exact location where one or more primary wall components are aligned when attached to a corresponding bottom plate, the top wall configuration differing from the bottom wall configuration and the top plate and the corresponding bottom plate being components of the same wall, the top wall configuration being printed on a first sector of the strip template and the bottom wall configuration being printed on a second sector of the strip template, the first sector of the strip template being delineated from the second sector of the strip template along a line substantially parallel to or coexistent with a longitudinal axis of the first template; and providing a wall plate pair, the wall plate pair comprising the top plate and the corresponding bottom plate, the top plate and the corresponding bottom plate being oriented substantially parallel to and immediately proximate to or in contact with each other; and affixing the strip template to the wall plate pair so that, (i) the longitudinal axis of the strip template is disposed substantially parallel with the longitudinal axis of the wall plate pair, (ii) the top wall configuration is disposed immediately proximate to or in contact with the top plate, and, (iii) the bottom wall configuration is disposed immediately proximate to or in contact with the corresponding bottom plate; and separating the first sector of the strip template from the second sector of the strip template; and terminating the wall plate pair by separating the top plate from the corresponding bottom plate, the first sector of the strip template remaining with the top plate and the second sector of the strip template remaining with the corresponding bottom plate.

12. The method of claim 11, wherein the strip template is affixed to the wall plate pair by non-adhesive means.

13. The method of claim 12, wherein:

a width side of the top plate of the wall plate pair is disposed immediately proximate to or in contact with a width side of the corresponding bottom plate of the wall plate pair; and upon affixing the strip template to the wall plate pair, the strip template is affixed to a thickness side of the wall plate pair, the thickness side of the wall plate pair comprising a thickness side of the top plate and a thickness side of the corresponding bottom plate.

14. A method of constructing a building comprising:

providing one or more mat templates, the one or more mat templates comprising one or more construction specifications printed on flexible, durable, substantially dimensionally stable material, the one or more construction specifications comprising placement indicia, the placement indicia illustrating the substantially exact location for installation of one or more building components on a floor of a building; the one or more mat templates being substantially water-resistant; and attaching the one or more mat templates in substantially precise position and orientation, to one or more floors of a nascent building, the attached one or more mat templates forming one or more substantially water resistant barriers.

15. The method of constructing a building of claim 14, wherein the one or more construction specifications further comprise descriptive indicia.

16. The method of constructing a building of claim 14, further comprising sealing a break between one or more adjacent mat templates, wherein:

the sealed break between the one or more adjacent mat templates is substantially water resistant; and the adjacent one or more mat templates form one or more substantially water resistant barriers.

17. The method of constructing a building of claim 14, further comprising:

installing the one or more building components according to the placement indicia; and removing one or more provisional areas of the one or more mat templates, the removal of one or more provisional areas occurring after building construction is substantially complete.

18. The method of constructing a building of claim 17, further comprising removing construction debris along with the one or more provisional areas of the second template.

* * * * *